May 22, 1928.
C. HERZOG
METHOD OF MANUFACTURING PIPES FROM ASBESTOS
CEMENT OR A SIMILAR MATERIAL
Filed May 6, 1927
1,670,855
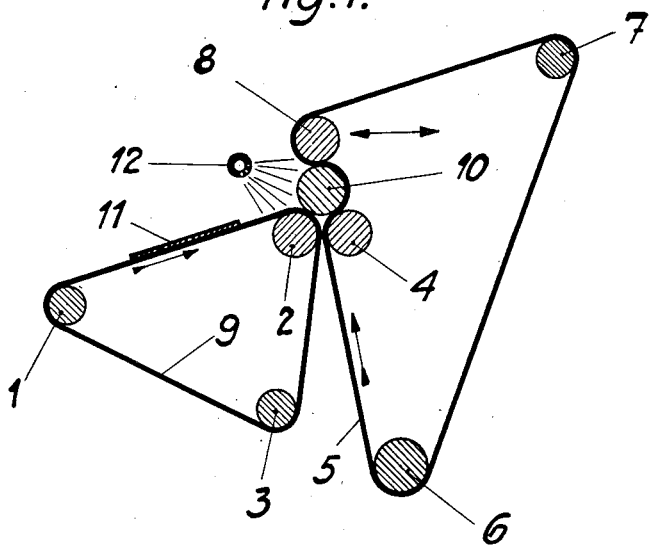
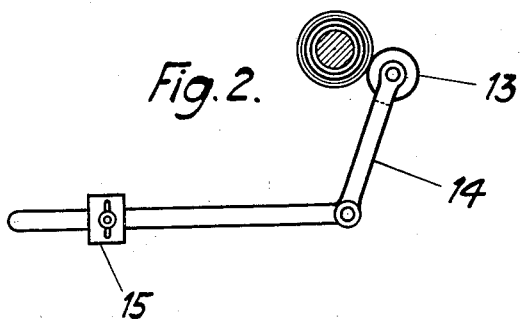
Inventor
Carl Herzog
by
Dean Fairbank Obright & Hirsch
his Attorneys Patented May 22, 1928.

1,670,855

UNITED STATES PATENT OFFICE.

CARL HERZOG, OF NIEDERURNEN, SWITZERLAND.

METHOD OF MANUFACTURING PIPES FROM ASBESTOS CEMENT OR A SIMILAR MATERIAL.

Application filed May 6, 1927, Serial No. 189,200, and in Switzerland July 30, 1926.

This invention relates to a new and improved method of manufacturing pipes from asbestos cement and similar materials.

The new method consists in winding up or making coils of slabs made on the well known cardboard machine from an asbestos-cement-mixture while still plastic on a mandrel, the surface of the slabs being at the same time thoroughly moistened, which is necessary for enabling the separate layers to become intimately united or felted together. The wound up blank thus produced is thereupon wrapped up in a water pervious cover and while it remains in this cover it is subjected to strong pressure. This pressing is effected, for instance, by one or more rotating pressing rollers being pressed by suitable means against the wrapped blank. Through the moistening of the blank while being wound and the subsequent pressing of the wrapped blank described above an intimate uniting or felting of the separated layers of the blank is effected and the excess of water is removed from the mass. By this means the blank consisting of separate superposed layers is converted into a pipe of homogeneous and close texture, which is very resistant to pressure. After the application of pressure the mandrel may be at once removed. In order that the pipe which is still soft shall retain its shape, the mandrel on which it is wound is replaced by a wooden mandrel, the pipe remaining on this wooden mandrel until the cement has set.

In the accompanying drawing an arrangement for carrying out the method is shown diagrammatically.

Fig. 1 shows an arrangement for winding up the asbestos-cement elements on a mandrel, and Fig. 2 shows a roller used for compacting the elements on the mandrel.

The arrangement shown comprises an endless band 9 of flexible material and as textile fabric which band 9 runs over horizontal rollers 1, 2, 3 one of which is driven by means of a motor (not shown in the drawing). The other rollers being driven by the band 9. The rollers 1, 2 are so disposed with respect to each other and the band is so dimensioned that the slab 11 of asbestos cement, which is to be wound to form the pipe, and which has been formed by a card board machine (not shown in the drawings) can be laid on the band 9 between the rollers. Immediately next to the roller 2 and parallel to it is a roller 4, over which a second endless band 5 runs the band running over guide rollers 8. The cylindrical winding mandrel 10 is laid loosely on the two rollers 2, 4 lying horizontally next to one another and at the same height. The slab 11 of asbestos cement mixture coming from the cardboard machine and still plastic is laid between the rollers 1, 2 on the band 9 and is conveyed by the latter in the direction of the arrow upwards to the mandrel 10. The latter is driven round owing to the friction of the band 9 and rotates in the direction of the arrow, taking the slab 11 from the band 9. The slab 11 winds up tightly on the mandrel. In order that the winding up shall take place in a reliable manner, the part of the band 5 lying between the rollers 4, 8 is used for pressing the slab 11 against the mandrel 10. For this purpose the roller 8 is disposed above the mandrel 10, so as to be capable of being adjusted in the direction of the arrow, the adjustment being effected by hand or automatically by means of an arrangement not shown in the drawing. During the winding operation water is sprayed on the slab 11 through a spraying pipe 12 lying parallel to the roller 4. When the slab 11 has been wound up on the mandrel 10, a cover, for instance of textile material, felt or perforated sheet metal, is laid on the band 9, the cover being also wound up on the completed blank.

The blank with its cover is removed from the mandrel 10 to a rotary press and is there given a rotary motion by means of a suitable driving gear, a heavy pressure being exerted on the blank by means of a pressure roller 13. The roller 13 is journalled so as to be rotatable in levers 14 and is pressed by means of adjustable weights 15 with more or less force against the blank. The mandrel 10 is rotated in such a direction that by the pressure of the roller 13 the cover is tightly drawn on the pipe.

This causes water to be pressed out of the mass, the asbestos cement mass being compressed to a homogeneous mass, so that a compact, solid wall of uniform thickness is produced. The pipe treated in this manner together with the cover is thereupon placed in a frame, and held firmly by the latter, while the mandrel 10 is withdrawn by means of a mechanical pulling device out of the pipe which is still soft. In place of the mandrel 10, a wooden shaft which is preferably composed of several parts is inserted in the pipe. The cover is removed and the pipe is placed on the bed to set. The separate layers of the blank become felted, owing to the supply of water and the subsequent pressing, and become intimately united. The added water is pressed out again on the rotary press.

A plurality of slabs may be wound up on the same mandrel placed side by side in the longitudinal direction of the mandrel with their edges overlapping each other, the separate slabs becoming firmly united by the subsequent pressing operation, so that seamless pipes of great length may be formed.

The pipe thus formed and still soft may also be pressed by positively driving not only the blank, but the pressure applying rollers as well. With a stationary or rotating blank a plurality of pressing rollers or only one such roller mounted in a rotary frame may revolve round the blank, while applying pressure to the same. The peripheral velocity and the direction of rotation of the pressure applying roller is made such that during the pressing operation the cover tends to be drawn more tightly around the blank, the important point being that there shall be no loosening.

Instead of being pressed by rollers the blank may be pressed on a pressing table, a reciprocating pressing table being, for instance, pushed over the yieldingly bedded blank, or the blank may be rolled under heavy pressure on a stationary table. In each case the wall of the plastic pipe is subjected to heavy pressure, during which the water is removed and the wall is compressed.

After the pipe has been pressed the cover might be removed and the still plastic pipe rotating with the mandrel be rolled without the cover for a short time. This will cause the pipe to become wider, so that it can be easily withdrawn from the mandrel.

What I wish to secure by U. S. Letters Patent is:—

1. A method of manufacturing pipes from asbestos cement which comprises the winding up of at least one slab of asbestos cement while still plastic on a mandrel, wrapping a flexible cover on the said pipe, and subjecting the pipe to pressure.

2. A method of manufacturing pipes from asbestos cement which comprises the winding up of at least one slab of asbestos cement while still plastic on a mandrel, wrapping a flexible cover on the said pipe, subjecting the pipe to pressure by means of at least one rotating roller and pressing said roller against the blank wrapped in the aforesaid cover.

3. A method of manufacturing pipes from asbestos cement which comprises the winding-up of at least one slab of asbestos cement while plastic, moistening the said slab while being rolled up, wrapping a flexible cover on said blank and subjecting the said blank to pressure.

4. A method of manufacturing pipes from asbestos cement which comprises winding-up at least one slab of asbestos cement while plastic, moistening the said slab while being rolled up, wrapping a flexible cover on said blank and subjecting the said blank to pressure, by means of a pressure applying roller and a mandrel and positively driving said pressure roller in such a manner that the cover not only does not become looser on the blank, but is stretched more tightly.

5. A method of manufacturing pipes from asbestos cement made in the carboard machine which comprises the conveying of the slabs by means of an endless band to a loosely journalled mandrel rotating said mandrel about its axis by the action of said endless band and a second endless band, winding up the slab on said mandrel while plastic, moistening the said slab while being rolled up, wrapping a flexible cover on said blank and subjecting the said blank to pressure.

6. A method of manufacturing pipes from asbestos cement in slab form which comprises conveying the slabs by means of an endless band to a loosely journalled mandrel, frictionally driving said mandrel by said band and by a second endless band, winding up the slab on said mandrel while plastic, spraying the surfaces with water, placing a piece of woven fabric on the first band conveying said fabric to the mandrel by the band, rolling up said fabric on the slab which has been wound around the mandrel, and pressing the coiled up slab while it is being wrapped up in said fabric.

In witness whereof I affix my signature.

CARL HERZOG.